UNITED STATES PATENT OFFICE.

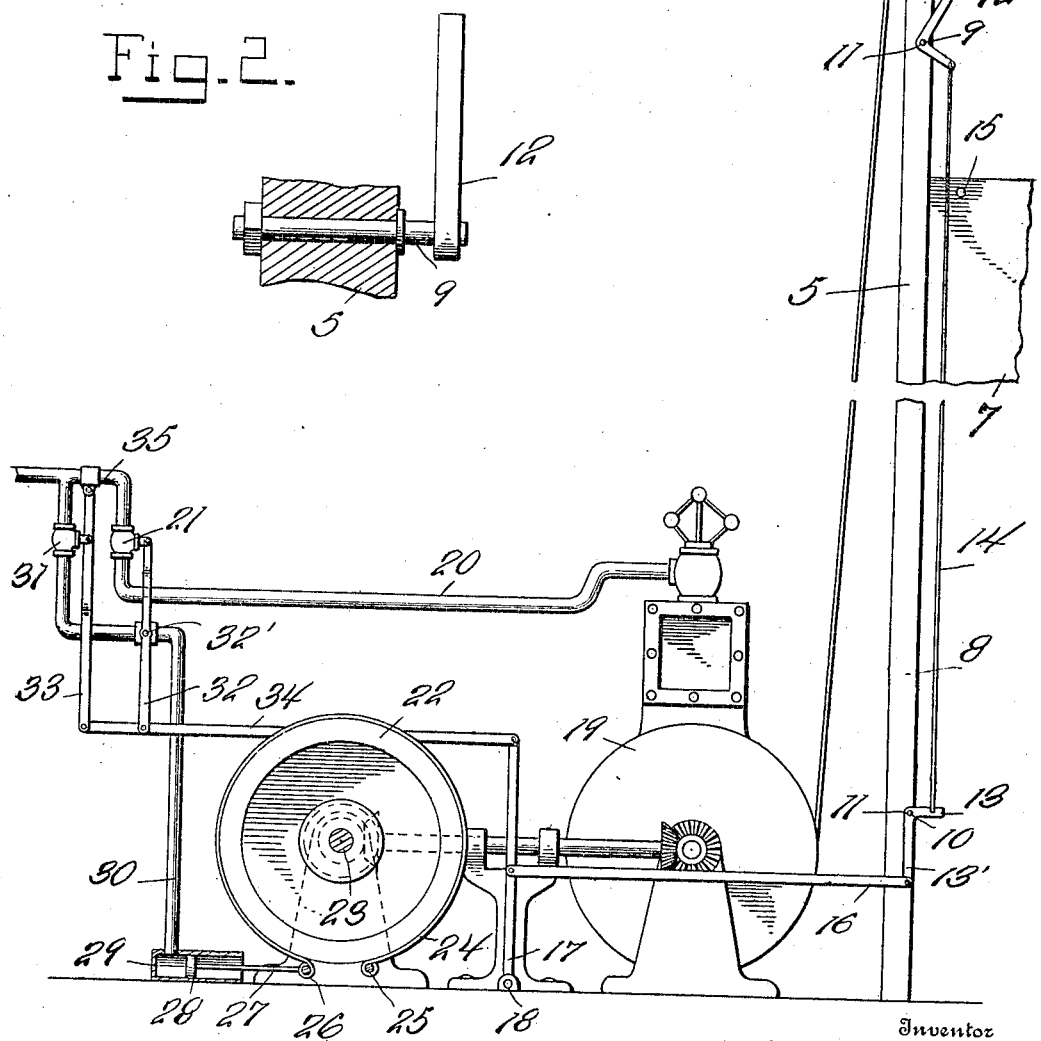

THEODORE WAUGHTAL, OF DOS CABEZOS, ARIZONA TERRITORY.

ELEVATOR-STOP.

No. 851,460.  Specification of Letters Patent.  Patented April 23, 1907.

Application filed May 18, 1906. Serial No. 317,542.

*To all whom it may concern:*

Be it known that I, THEODORE WAUGHTAL, a citizen of the United States, residing at Dos Cabezos, in the county of Cochise, Arizona Territory, have invented certain new and useful Improvements in Elevator-Stops; and I do hereby declare the following to be a full, clear, and exact description of the invention, such as will enable others skilled in the art to which it appertains to make and use the same.

This invention relates to elevators and more particularly to safety attachments therefor, and has for its object to provide a mechanism for fluid operated elevators which will be automatically operated by a cage to stop the cage and prevent it from striking the hoisting sheave.

In the drawings forming a portion of this specification and in which like numerals of reference indicate similar parts in the several views, Figure 1 is an elevational view showing an elevator cage and the present mechanism, a portion of the mechanism being shown in section. Fig. 2 is a view of one of the angle levers showing its mounting.

Referring now to the drawings, there is shown an elevator shaft 5 having a hoisting sheave 6 and having mounted therein a cage 7.

Mounted upon one of the uprights 8, there are laterally extending bracket arms 9 and 10 respectively, which are engaged in openings 11 at the angles of upper and lower angle levers 12 and 13 respectively. The mutually adjacent arms of these levers extend laterally, as shown and are connected by means of a rod 14. The upper arm of the lever 12 lies normally inclined upwardly and inwardly from the upright 5, in position for engagement by a projection 15 carried by the cage to move the lever upwardly and therewith the rod 14. The lever 13 has a downwardly extending arm 13' to which there is connected a horizontally extending rod 16 and this rod is secured to a vertically extending arm 17 pivotally mounted at its lower end, as shown at 18.

A cage-hoisting engine is shown at 19 and has a fluid-supply pipe 20 connected therewith and provided with a throttle 21. A brake drum 22 is mounted upon a shaft 23 which is connected with the hoisting mechanism and a contractible brake band 24 surrounds the drum, this brake band being fixed at one end, as shown at 25 and having its other end 26 connected with a piston rod 27 carried by a piston 28 which is slidably mounted within a cylinder 29, and the arrangement is such that movement of the piston in one direction will contract the band 24 to frictionally engage the drum 22 and hold the latter against rotation.

A fluid supply pipe 30 communicates with the cylinder 29 at the opposite side of the piston from the rod 27, so that the admission of fluid to the cylinder will cause the rod to move to bring the brake band into engagement with the drum. The pipe 30 communicates with the pipe 20 between the throttle 21 and the source of fluid supply and the pipe 30 is provided with a throttle 31. These throttles are of the slide type, and levers 32 and 33 are provided for the throttles 21 and 31 respectively. The lever 32 is pivoted at its upper end to the stem 21' of the throttle and at its lower end to a rod 34 which is connected with the upper end of the arm 17, this lever 32 being pivotally mounted between its ends, as shown at 32'. The rod 33 is pivotally mounted at its upper end to a suitable support, as shown at 35 and at its lower end to the rod 34, the stem 31' of the valve 31 being pivoted to the rod 33 between its ends.

It will thus be seen that the arrangement of parts is such that upward movement of the cage 7 brings the projection 15 into engagement with the lever 12 to move the rod 14 upwardly, which movement will be communicated through the lever 13 and rod 16 to the arms 17, which will be moved away from the drum 22 to move the levers 32 and 33. Movement of these levers will close the throttle 21 to stop the engine 19, and at the same time the throttle 31 will be opened to admit fluid to the cylinder 29 which will cause the brake band to engage the drum as explained in the foregoing, and stop the mechanism. It will thus be seen that the cage will be prevented from striking the sheave 6.

What is claimed is:

In a stop mechanism for elevators, the combination with fluid operable lifting mechanism, of a brake for said mechanism, fluid operable mechanism connected with the brake for operation thereof, fluid conducting pipes communicating with said brake operating mechanism and with the lifting mechanism respectively, valves for the pipes, a primary lever connected with one of the valves for operation thereof, a secondary lever connected with the other valve for operation thereof, connections between the levers for simultaneous movement thereof, and car operable means operatively connected with the valve-moving means.

In testimony whereof, I affix my signature, in presence of two witnesses.

THEODORE WAUGHTAL.

Witnesses:
G. A. DINWIDDIE,
T. K. MITCHELL.